July 12, 1932.     F. B. STOVER     1,866,914

TUBE CONNECTION

Filed July 15, 1929

INVENTOR

Frank B. Stover,

BY

ATTORNEYS

Patented July 12, 1932

1,866,914

UNITED STATES PATENT OFFICE

FRANK B. STOVER, OF DETROIT, MICHIGAN, ASSIGNOR TO SKY SPECIALTIES CORPORATION, OF DETROIT, MICHIGAN, A CORPORATION OF MICHIGAN

TUBE CONNECTION

Application filed July 15, 1929. Serial No. 378,242.

The present invention pertains to a novel joint or coupling for tubing, piping and the like. The construction herein described has been designed particularly for use in connection with copper or similar tubing for conveying such fluids as may be necessary in the starting or operation of internal combustion engines. An example of such application of the invention occurs in the tubing which joins the outlets of a compressed air starting device to the cylinders on an aeroplane engine, although it will be understood that the invention is not confined to such specific use, but is rather applicable to all cases in which the herein described coupling may be employed.

Where a piece of tubing is connected to a body by means of a sleeve or coupler secured to the body, it has been customary to surround the tubing with a tightly fitting sleeve or ferrule and then force a portion of the ferrule into the space between the tubing and the coupler by means of a nut screwed on the latter. In being jammed in this manner, the ferrule ordinarily turns its sharp edge into the tubing thereby cutting and weakening the tubing, and the subsequent vibration of the tubing at the cutting-in points of the ferrule increases the damage and finally breaks the tubing off at the edge of the ferrule so that the effect thereof is destroyed. Or in the case where the tubing is soldered to the ferrule the vibration is centered at the weakest spot at the point where the tubing enters the ferrule, and ordinarily from vibration tubing will start cracking at this point, due to the fact that the tubing and ferrule soldered together make that portion so much stiffer than the tubing itself that the weakest spot is at the edge of the joining.

The object of the present invention is to overcome these difficulties and to provide a joint which will not deteriorate so rapidly in consequence of the vibration of the tubing. The cutting of the tubing is avoided by the fact that the edge of the ferrule is not pressed into the tubing by the coupler, as the coupler does not function on the ferrule until it rides past the edge and up on to its body, at which point the jamming of the coupler against the ferrule forces a smooth edge into the tubing and no cutting takes place. Thus the ferrule may be jammed between the tubing and the coupler without damage. A novel means of preventing the transmission of vibrations from the tubing to the ferrule is also provided, and this consists in spacing at least a portion of the ferrule from the outer wall of the tubing, as distinguished from the current practice of fitting the ferrule tightly on the tubing at all points. It has been found that the spaced part of the ferrule dampens or retards the vibration of the tubing and hence diminishes the detrimental effects of vibration on the joint.

The invention is fully disclosed by way of example in the following description and in the accompanying drawing in which—

Reference to these views will now be had by use of like characters which are employed to designate corresponding parts throughout.

Figure 1:
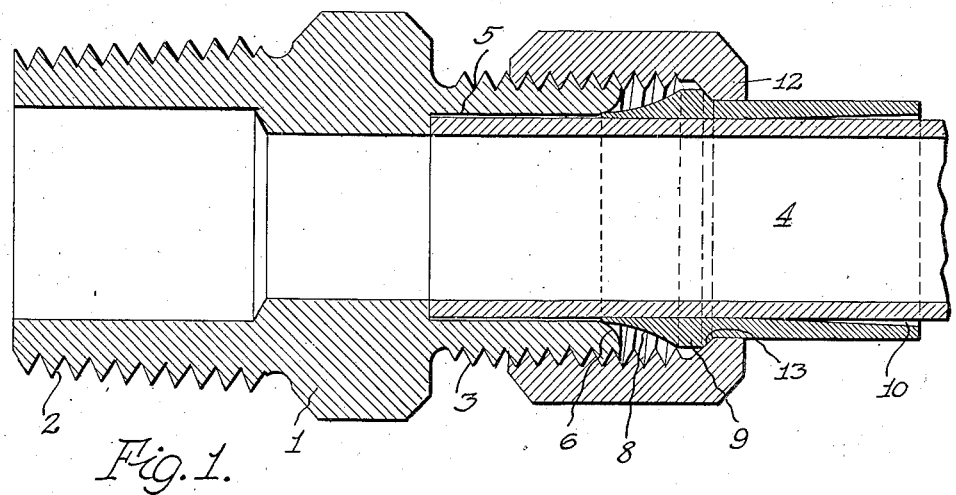
Figure 1 is a longitudinal section of the joint before compression.
Figure 2:
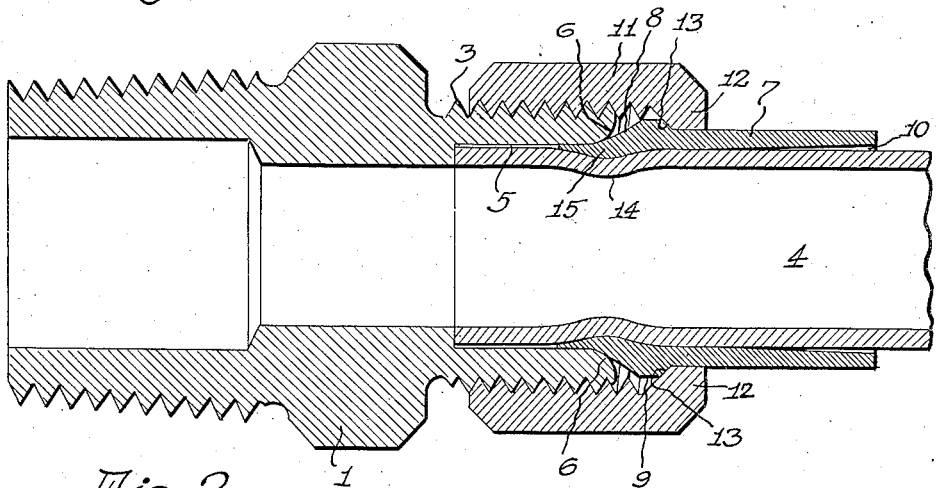
Fig. 2 is a similar section of the joint after compression.
Figure 3:
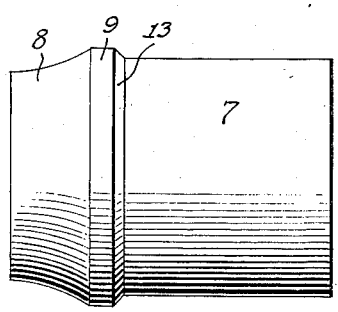
Fig. 3 is an elevation of the ferrule.

In Fig. 1 is illustrated a sleeve or coupler 1 which, by means of an externally threaded end 2, is anchored to the body with which the tubing is to communicate. The other end of the coupler is also externally threaded at 3 and is adapted to receive one end of the tubing 4, at the same time permitting a clearance 5 so that the tubing may easily be inserted. It is also to be noted that the inner wall of the coupler 1 is rounded or flared at 6 at the extremity through which the tubing enters. It may be assumed for the purposes of description that the coupler 1 is of brass and the tubing 4 of a softer metal, such as copper.

The tubing is surrounded by a ferrule 7 which may also be of brass and which has its wall tapered at 8 at the end received within the flared inner wall 6 of the coupler. The ferrule also has an external rib or shoulder 9 provided for a purpose which will presently appear. Outwardly of the shoulder, the inner wall of the ferrule is spaced from the outer wall of the tubing, as indicated by the numeral 10, preferably by gradually increasing the internal diameter of the ferrule.

The joint is secured by means of a nut 11 screwed on the threaded end 3 and formed at its trailing end with an internal flange 12 adapted to engage the rib 9 at the side more remote from the coupler 1. The engaging parts of the rib and flange may be of any suitable configuration and are herein illustrated as being sloped or conical as indicated by the numeral 13.

As the nut is turned on the threaded end 3, the flange 12 tends to move the tapered end 8 of the ferrule into the coupler. The tapered end readily rides beneath the flared end 6 to a limited extent, but due to the softer character of the tubing 4, the latter will bend inwardly as at 14 under the pressure of the ferrule which will also be bent beneath the flared end 6 as designated by the numeral 15. In other words, the tapered side rather than the edge, of the ferrule is compressed or packed between the tubing and the coupler.

The bent contacting parts of the tubing and ferrule are obviously in as close engagement as possible, while the ferrule similarly engages the inner wall of the coupler with equal firmness so that a perfect joint is formed.

The rounded receiving end of the coupler prevents initial and subsequent cutting of the tubing by the ferrule or weakening of the ferrule. The portion of the ferrule spaced from the tubing serves as a fixed member which is intermittently engaged by the tubing during the vibration thereof, so that the vibration and the damaging effects thereof on the joint will be greatly reduced and perhaps entirely eliminated.

Although a specific embodiment of the invention has been illustrated and described, it will be apparent that various alterations in the details of construction may be made without departing from the scope of the invention as indicated by the appended claims.

What I claim is:—

1. In a joint for tubing, an exteriorly threaded tubular coupler, a tube having one end received in said coupler, a ferrule surrounding said tube at said coupler, said ferrule having a portion of its wall diverging gradually and spaced radially from the outer wall of said tube, a rib formed on said ferrule, and a nut screwed on said coupler and having an internal flange abutting said rib and adapted to press the same towards said coupler, said spaced portion of said ferrule being disposed exteriorly of said nut.

2. In a joint for tubing, an exteriorly threaded tubular coupler, the inner wall of said coupler being flared at one end thereof, a tube having one end received in said flared end, a ferrule surrounding said tube at said flared end, said ferrule having a portion of its wall spaced radially from the outer wall of said tube, a rib formed on said ferrule, and a nut screwed on said coupler and having an internal flange abutting said rib and adapted to press the same towards said coupler, said spaced portion of said ferrule being disposed exteriorly of said nut.

3. In a joint for tubing, an exteriorly threaded tubular coupler, the inner wall of said coupler being flared at one end thereof, a tube having one end received in said flared end, a ferrule surrounding said tube and having a tapered end received in said flared end, said ferrule having a portion of its wall spaced radially from the outer wall of said tube, a rib formed on said ferrule, and a nut screwed on said coupler and having an internal flange abutting said rib and adapted to press the same towards said coupler, said spaced portion of said ferrule being disposed exteriorly of said nut.

4. In a joint for tubing, an exteriorly threaded tubular coupler of substantially uniform internal diameter enlarged at the outer end, a tube having one end received in said coupler, a ferrule surrounding said tube at said coupler, a rib formed on said ferrule, and a nut screwed on said coupler and having an internal flange abutting said rib and adapted to press the same towards said coupler, said nut and ferrule being in non-wedging relation to each other behind said rib, the extremity of said ferrule entering said coupler having an external diameter greater than said internal diameter, whereby said extremity is pressed into said tube.

In testimony whereof I affix my signature.

FRANK B. STOVER.